Figure 1:
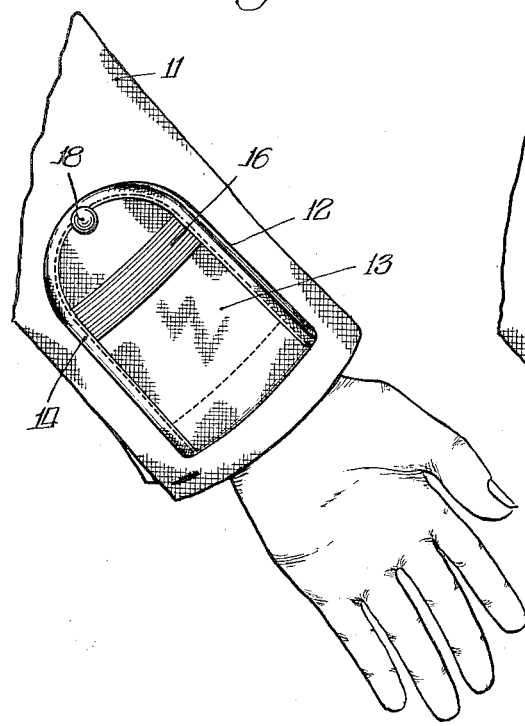

Nov. 14, 1939.   W. H. FORD   2,179,548
DRESSER FOR FISHING LINES AND FLIES
Filed Feb. 25, 1939

INVENTOR.
William H. Ford,
BY Walter M. Fuller
ATTORNEY.

Patented Nov. 14, 1939

2,179,548

UNITED STATES PATENT OFFICE 2,179,548

DRESSER FOR FISHING LINES AND FLIES

William H. Ford, Chicago, Ill., assignor to Red Head Brand Company, Chicago, Ill., a corporation of Illinois Application February 25, 1939, Serial No. 258,403

2 Claims. (Cl. 2—94)

In game fishing, such as for trout or bass, where it is necessary to wade streams or along shores, it is essential that the fisherman's equipment include a coat with conveniences for carrying the tackle required on the trip.

According to the climate and season of the year, the coat can be made of light or heavy material with its length adequate to provide a multiplicity of pockets, but the coat should also be sufficiently short to avoid its trailing in the water while its occupant is wading.

Besides these features, such a coat has means for holding the rod-tip upright while dropping the butt of the rod in the pocket of the coat, or boot-top, or any other practical place, so that both hands may be disengaged to permit disgorging of a fish, or the changing of flies, or the dressing of flies, or line, while keeping the rod and reel out of the water, sand or grass.

For best work in fishing with flies, it is important that the line be kept clean and well-dressed with an appropriate oil or fatty substance that will promote floatability, and, similarly, artificial flies should be treated to keep them afloat.

Devices for cleaning and dressing lines and flies are usually separate from other equipment, and, after having been saturated with a dressing, are inconvenient to carry in a pocket unless placed in a separate grease-proof container, and they are troublesome and discommodious to get at, because of other things in the pockets, which are likely to become messy also.

In order to provide against this inconvenience and to preclude the possibility of loss of the dressing-device, I have devised a simple flap, which is sewed to or otherwise attached to the inner or lower section of the sleeve, preferably, but not necessarily, at the cuff and desirably made of the same material as the coat sleeve.

In the center, or at any other portion, of this flap is a pad of sheepskin with the wool left on, or other absorbent material.

In addition, an elastic web strap may be sewed over the opposite side of the flap toward the end to provide means where the fingers of the wearer of the coat may be slipped in easily as a means of holding such pad, mitt-fashion, in the palm of the hand.

A female snap-button is fastened near the tip of the flap which engages with a male snap-button on the sleeve, a similar distance from the cuff upward on the sleeve so that when the pad is not in use, it may be folded up out of the way and be detachably secured in such relation.

Sewed to the sleeve is another patch similar in size to the flap and which may form an extension of the same, which is treated with a preparation to make it greaseproof, in this way seeking to avoid soiling of the coat-sleeve.

This dressing-appliance is usually on the left sleeve of the coat, but for left-handed individuals, it may be placed on the right sleeve, and, when the line is required to be cleaned or dressed, or the fly dressed, the flap is unsnapped from its upper, out-of-the-way, inoperative position and brought down over the palm of the hand with the fingers slipped through the elastic-web strap.

The dressing-pad is then exposed and the line can be run freely across the pad to be properly cleaned and dressed, and the flies may be squeezed in the dressing pad and absorb some of the dressing to make them float.

To enable those acquainted with this art to understand the invention more fully, both from structural and functional standpoints, a present preferred embodiment of the invention has been illustrated in detail in the accompanying drawing forming a part of this specification and to which reference should be had in connection with the following description, and, for simplicity, like reference numerals have been used throughout the views of the drawing to designate the same parts or members.

Figure 2:
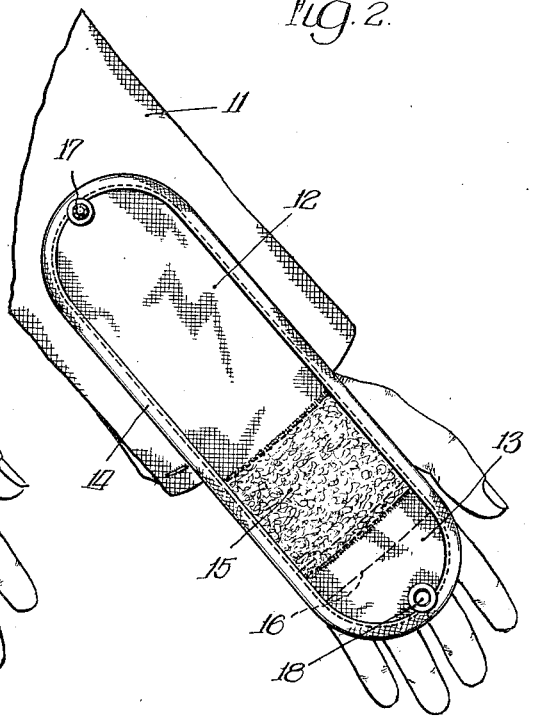

In this drawing:

Figure 1 shows the new and improved line and fly dressing-device in folded inoperative position secured on the lower inside portion of the left sleeve of a fisherman's coat; and Figure 2 illustrates such dressing-appliance unfolded and in operative position on the hand of the wearer of the coat.

It will be readily perceived from the drawing that 11 denotes the lower portion of the left sleeve of a coat worn by the fisherman and on the inner side of such part of the sleeve there is attached, as by stitching, the upper half 12 of a suitably-shaped grease-proof piece of textile-fabric, the lower half 13 of which constitutes a flap, such fabric-piece desirably having a binding 14 secured to it and extending completely around it and, in fact, for the purposes of strength, the stitching which fastens the upper section of the fabric to the sleeve may be made through such reenforcing fabric-binding 14.

The lower or flap portion 13 of the fabric-member on its inner surface is equipped with an appropriate or suitable pad 15, such as a piece of lamb-skin with the wool on, adapted and designed to be charged with a suitable dressing of a fatty, greasy or oily nature, such pad conveniently being fastened to the flap by stitching its margin thereto with its opposite ends secured under the binding-strip 14.

The opposite side or face of the flap has an elastic-web strap 16 stitched thereto at its opposite ends and this attachment may be easily and conveniently made by having the ends of the strap inside of the binding strip 14 and fastened to the flap by the same stitching which attaches the binding to the fabric.

As is clearly illustrated, the top end of the fabric-piece section 12 is equipped with a male snap-fastener 17 and the lower end section of the flap 13 has a companion or correlated female snap-fastener 18 which may coact with the fastener 17 in the usual way to maintain the flap in upwardly-folded inoperative or inactive position with its pad properly covered and concealed as shown in Figure 1.

Thus, when the dressing-pad is not in use, it is suitably encased in the folded fabric-piece which protects the garment from the dressing agent or material by reason of the dressing-proof property of both sections 12 and 13 of the fabric.

When the pad is to be used for the purpose indicated, the flap is unfastened and turned down and the hand of the wearer of the coat is inserted between the flap and the elastic-strap thus enabling him to hold the pad in the palm of his hand during the dressing of the line or flies.

Those acquainted with this art will readily understand that this invention is not limited and restricted necessarily to the precise and exact details of structure set forth and that various modifications or changes may be resorted to without departure from the heart and essence of the invention and without the loss or sacrifice of any of its material benefits and advantages.

I claim:

1. A fisherman's coat having, in combination therewith, a flap secured to the lower portion of the inner exterior surface of a sleeve of the coat and adapted to extend downwardly beyond the lower edge of the sleeve to be engaged by the hand of that arm of the wearer of the coat occupying said sleeve, an absorbent pad secured to the outer face of said flap and adapted to be charged with a dressing-agent for the fisherman's line or fly, and means to detachably hold said flap folded up against said sleeve with said pad between the flap and sleeve.

2. The construction set forth in claim 1 in which said sleeve is provided with means to prevent said dressing-agent of the pad from soiling said sleeve.

WILLIAM H. FORD.